Feb. 20, 1962   J. W. EDGEMOND, JR., ETAL   3,021,881
POWER SAW

Original Filed Dec. 31, 1956   2 Sheets-Sheet 1

INVENTORS
John W. Edgemond, Jr.
BY  John J. O'Connor

ATTORNEYS

Feb. 20, 1962   J. W. EDGEMOND, JR., ETAL   3,021,881
POWER SAW
Original Filed Dec. 31, 1956

INVENTORS
John W. Edgemond, Jr.
BY  John J. O'Connor

ATTORNEYS

United States Patent Office

3,021,881
Patented Feb. 20, 1962

3,021,881
POWER SAW
John W. Edgemond, Jr., Los Altos, and John J. O'Connor, Menlo Park, Calif., assignors to Yuba Consolidated Industries, Inc., San Francisco, Calif., a corporation of Delaware
Original application Dec. 31, 1956, Ser. No. 631,820, now Patent No. 2,945,516, dated July 19, 1960. Divided and this application Jan. 28, 1959, Ser. No. 792,942
1 Claim. (Cl. 143—174)

This invention relates to power saws and particularly to so-called table saws in which the saw blade is adapted to be raised and lowered with respect to a work piece supporting table and is also adapted to be tilted with respect to the table.

Generally in devices of this kind the size of the work piece is to some extent limited by the size of the work table.

It is an object of this invention to provide an outrigger type of table which will be provided either with solid or roller type supports for the work piece and which is also adapted to support a fence mechanism.

These and other objects of our invention will be made clear from the following specification taken in conjunction with the accompanying drawings in which:

FIGURE 3 is an end view of the outrigger table construction illustrated in FIGURE 1;

FIGURE 4 is an end view of one form of the outrigger construction illustrated in FIGURE 1;

Figure 1:
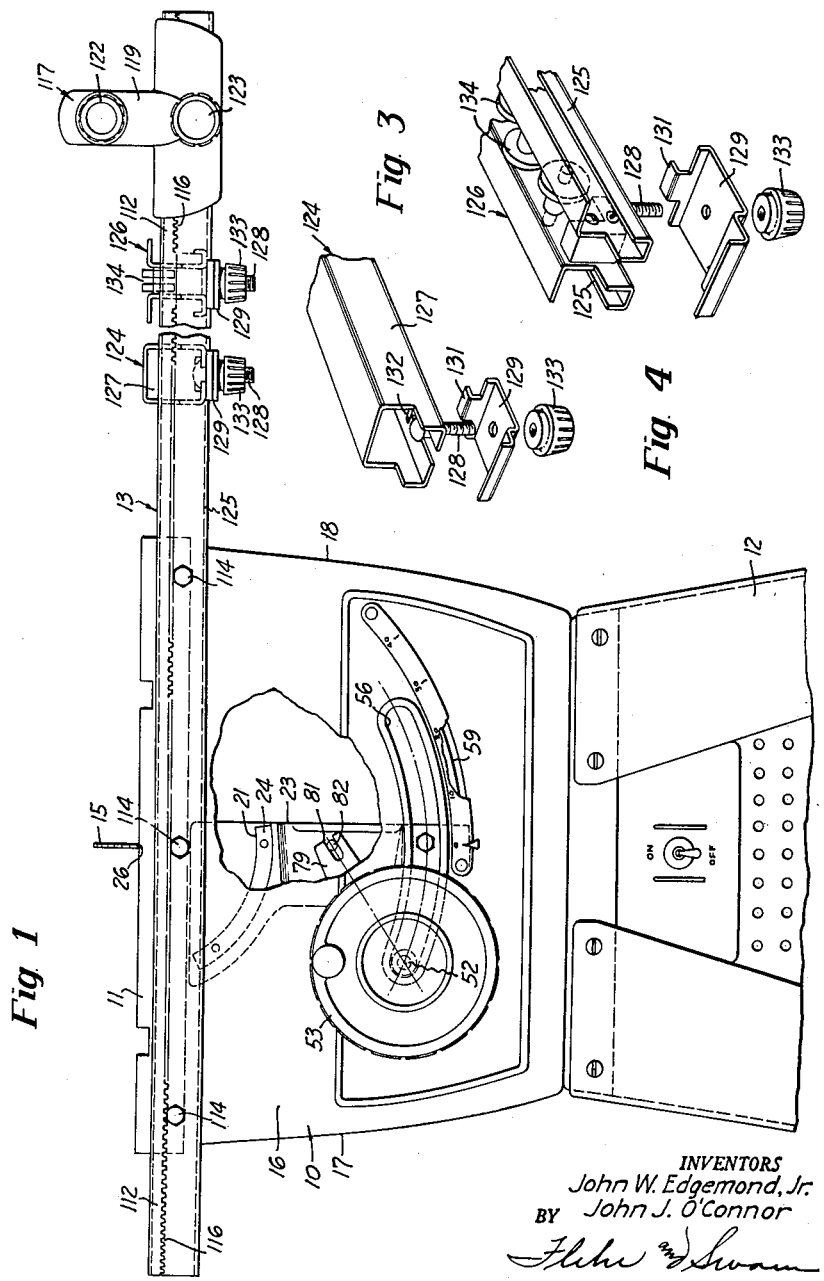
FIGURE 1 represents a front view, partially in cross section, of a table saw incorporating our invention.

The present invention is a division of copending application, Serial No. 631,820, filed December 31, 1956, now U.S. Patent 2,945,516 and assigned to the same assignee as herein.

As shown in the drawings, our invention consists primarily of a tub assembly 10 which supports the cradle upon which the saw is mounted and by which it is adapted to be tilted. The tub also supports the mechanism for tilting the cradle. The tub 10 supports the table 11 and is, in turn, supported upon a stand 12. An outrigger assembly 13 is secured to the table 11. Motor 14 which is pivotally mounted to the rear of the tub 10 is adapted to operate the saw blade 15.

The stand 12 is of any conventional type and its construction is unimportant except for the fact that it supports the entire mechanism at the proper height for its satisfactory use by an operator.

The tub assembly 10 consists of an integral die cast front portion 16 to which the side panels 17 and 18 may be secured in any suitable manner. The front portion 16 and the rear column portion of the side panels 17 and 18 support the table 11. A rear trunnion 19 is secured to the table 11 remote from and parallel to the die cast front member 16.

The front integral casting 16 and the rear trunnion are provided with arcuate slots 21 and 22 which are concentric and which support a cradle 23 which is provided with arcuate members 24 and 25, which may be secured thereto in any suitable manner, but which are adapted to be accommodated within the slots 21 and 22 respectively so that the cradle 23 may be moved arcuately about a line 26 on the table 11, which line is also the line at which the saw blade 15 projects through the top of table 11. It will be apparent, therefore, that as the cradle 23 is swung about the line 26, the saw blade 15 which is supported by the cradle will likewise be tilted about the line 26 in such a manner that as a work piece is urged across the top of the table, the kerf or cut made by the blade 15 will be at the same angle. It will be noted that the members 24 and 25 are shorter in length than are the arcuate slots 21 and 22. This is, of course, an essential requirement of construction to permit the members 24 and 25 to move through the entire lengths of the arcs formed by the slots 21 and 22 whereby the blade 15 may be moved from a vertical position to a position of approximately 45° with respect thereto as illustrated, for example, in FIGURE 4.

Figure 2:
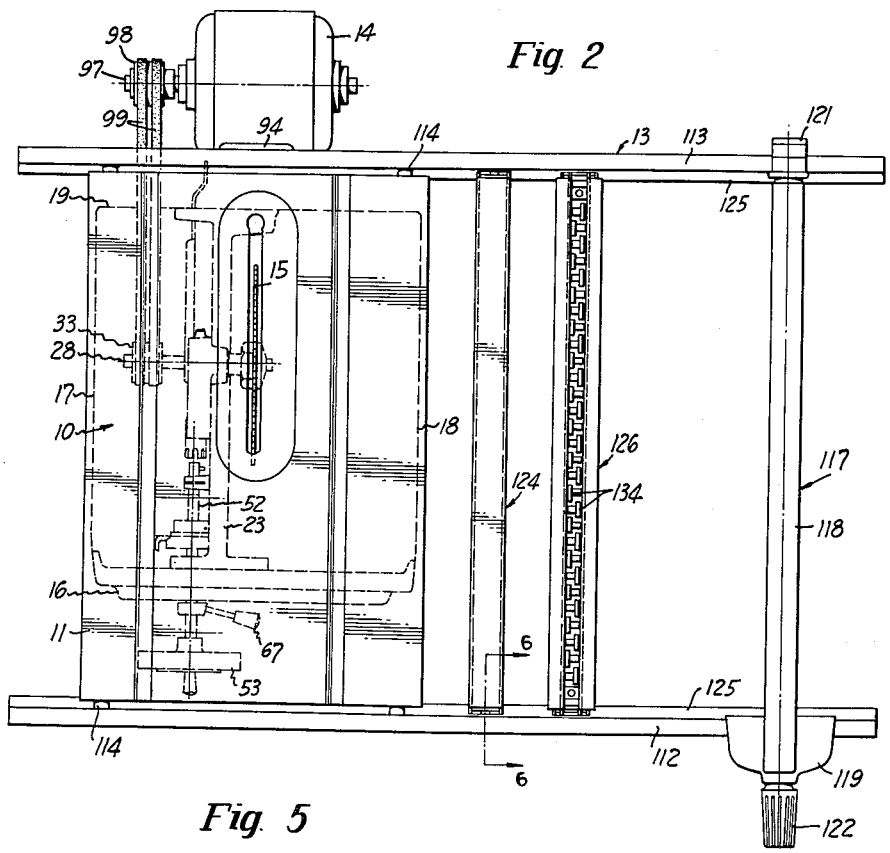
FIGURE 2 is a top plan view of a table saw incorporating our invention illustrating a portion of the device in dotted lines.
Figure 5:
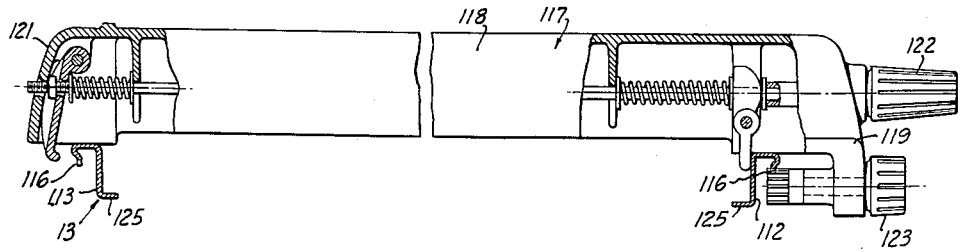
FIGURE 5 is a side elevational view, partially in cross section, of the fence.
Figure 6:
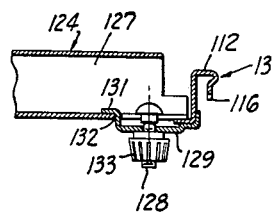
FIGURE 6 is a cross sectional detail taken along the line 6—6 of FIGURE 2.

The table 11 is provided with a plurality of outwardly extending members 112 and 113 which are formed generally as illustrated in FIGURE 5 and which are mounted as shown in FIGURES 1 and 2. The outrigger members 112 and 113 are secured to the front and rear edges of the table 12 by means of bolts 114. Although the members 113 and 112 are shown extending to the right, as viewed in FIGURE 2 for example, they may be caused to extend to the left.

The turned lip portion of the member 112 is provided with teeth 116.

The members 112 and 113 are adapted to accommodate a fence 117. The fence 117 consists of a vertical or upright portion 118 and end portions 119 and 121. The member 119 accommodates a control knob 122 and the entire fence assembly 117 is substantially identical to that described in copending Edgemond et al. application Serial No. 494,468, filed March 15, 1955 for a "Combination Power Tool," now U.S. 2,927,612, granted March 8, 1960.

As described in that application the fence is provided with locking means which is responsive to the control knob 122. When the knob 122 is tightened, the locking member in the member 119 first engages extending member 112. Rotation of the knob 122 also operates a clamping device mounted in the assembly 121 which tends to lock that assembly to the member 113. The clamping assembly in the member 119 engages the member 112 before the clamping assembly in the member 121 engages the member 113, and thus, since the member 121 is provided with an enlarged flat surface which bears against the forward edge of the member 112, the fence assembly 117 will be properly aligned when the front clamping member locks the member 119 against the member 112. Continued rotation of the knob 122 will lock the clamping member in the assembly 121 to the rear outrigger 113. Thus it will be seen that the fence 117 may be locked at any point along the length of the members 112 and 113 and that the length of the work piece is not limited by the size of the surface of the table 11. The member 121 is also provided with a second knob 123 which actuates a shaft upon which a suitable toothed gear (not shown) is mounted which gear engages the teeth 116 whereby, when the knob 122 is loosened, and the knob 123 is rotated, the toothed member will engage the teeth 116 and move the fence laterally along the members 112 and 113.

Members 112 and 113 also accommodate one or more work piece support members 124 or 126.

The work piece support member 124 as illustrated in FIGURE 3 consists of a square member 127 which is adapted to ride on the inturned flanges 125 on the members 112 and 113 respectively. The front end of the member 127 is provided with a slot and a downwardly extending threaded member 128 which is adapted to receive a plate 129. The plate 129 is provided with a rearwardly extending lip 131 which is accommodated within a slot 132 in the bottom of the member 127. A nut 133 is adapted to be mounted on the threaded member 128. When the assembly illustrated in FIGURE 3 is properly assembled, the lower surface of the tubular member 127 rides on top of the flange 125 and the plate 129 rides thereunder. When the member 133 is tightened, the member 124 is locked with respect to the guide 112 and the device is locked with respect thereto. The clamp plate 129 is also used at the opposite ends of 127 and 126 to also clamp on lip of 113.

The work piece support member 126 illustrated in FIGURE 4 is provided with locking means substantially identical to that described in connection with the device 124 illustrated in FIGURE 3. However the upper surface of the member 126 is not flat as is the upper surface of the member 124 but it is provided with an elongated slot which accommodates a plurality of rotatable members 134. The plane of the upper edges of the rotatable members 134 is coplanar with the upper surface of the table 11 so that a work piece, one of whose ends is supported by the table 11 will also be supported by the members 134. Since the members 134 are rotatable frictional engagement between the work support member 126 and the work piece is reduced to a minimum.

We claim:

In a power saw construction of the type having a saw table and a rotatable saw blade, an elongated outrigger member secured across the front of said saw table and a similar elongated outrigger member secured across the rear of said saw table, wherein the outrigger members extend considerably beyond one side of the table, and wherein further the upper surfaces of the outrigger members define a plane which is parallel to and spaced below the plane defined by the work surface of said saw table, the combination of a work piece supporting member supported between said elongated outrigger members to support a workpiece laterally of said blade and said table, the supporting surface of said work piece support member lying coplanar with the work surface of said saw table and above the plane of said outriggers, a rip fence movable along and supported by said outrigger members and disposed generally parallel to the plane of the saw blade and to said work piece support member, said fence being spaced to clear the work surface of said saw table and said support member to permit uninterrupted movement of said fence across said work surface and said support member, whereby said fence can be utilized to guide work pieces narrower than the spacing between the edge of the saw table and the saw blade as well as those extending laterally substantially to the limits of the outriggers.

References Cited in the file of this patent

UNITED STATES PATENTS

| | | |
|---|---|---|
| 1,938,548 | Tautz | Dec. 5, 1933 |
| 2,013,778 | Halvorsen et al. | Sept. 10, 1935 |
| 2,237,615 | Roberts | Apr. 8, 1941 |
| 2,633,221 | Roeder | Mar. 31, 1953 |
| 2,748,812 | Nelson | June 5, 1956 |
| 2,806,493 | Gaskell | Sept. 17, 1957 |
| 2,818,092 | Grossett | Dec. 31, 1957 |
| 2,919,729 | Edgemond et al. | Jan. 5, 1960 |
| 2,927,612 | Edgemond et al. | Mar. 8, 1960 |
| 2,945,516 | Edgemond et al. | July 19, 1960 |